United States Patent [11] 3,616,853

| [72] | Inventor | Robert C. Ayers, Jr.<br>Houston, Tex. |
| --- | --- | --- |
| [21] | Appl. No. | 15,834 |
| [22] | Filed | Mar. 2, 1970 |
| [45] | Patented | Nov. 2, 1971 |
| [73] | Assignee | Esso Production Research Company |

[54] OIL RECOVERY PROCESS USING TALL OIL ADDITIVE
8 Claims, No Drawings

[52] U.S. Cl. ........................................ 166/273, 166/274
[51] Int. Cl. ...................................... E21b 43/22
[50] Field of Search ........................................ 166/268, 273, 274; 252/8.55 D

[56] References Cited
UNITED STATES PATENTS

| 3,163,214 | 12/1964 | Csaszar | 252/8.55 D X |
| --- | --- | --- | --- |
| 3,236,303 | 2/1966 | Csaszar | 166/274 |
| 3,303,879 | 2/1967 | Williams | 166/273 |
| 3,330,344 | 7/1967 | Reisberg | 166/273 |
| 3,444,930 | 5/1969 | Williams et al. | 166/273 |
| 3,497,007 | 2/1970 | Williams et al. | 166/273 |
| 3,500,922 | 3/1970 | O'Brien et al. | 166/273 |

*Primary Examiner*—Ian A. Calvert
*Attorneys*—James A. Reilly, John B. Davidson, Lewis H. Eatherton, James E. Gilchrist, Robert L. Graham and James E. Reed ABSTRACT: A method of recovering oil from a subterranean oil-bearing formation. An oil solvent mixture containing a polar organic solvent and a tall oil additive is injected into a well and the formation. The oil solvent mixture is displaced through the formation by a low-salinity aqueous solution which is substantially free of surface active agents. Oil which is displaced from the formation by the oil solvent mixture and low-salinity aqueous solution is recovered by means of a well penetrating the formation.

OIL RECOVERY PROCESS USING TALL OIL ADDITIVE

BACKGROUND OF THE INVENTION

1. Field of the Invention

This invention relates to a process for recovering oil from a subterranean formation utilizing a well into which a fluid is injected and caused to enter the pores of the formation. More particularly, this invention relates to a method for displacing and recovering oil by injecting an oil solvent mixture containing a polar organic solvent and a tall oil additive. The oil solvent mixture is in turn displaced by a low-salinity aqueous solution which is substantially free of surfactants.

2. Description of the Prior Art

Miscible displacement of crude oil from a formation has undergone intensive study in recent years. In such a recovery mechanism a small bank of an oil solvent is injected into the reservoir and displaced with a driving agent. Since the oil solvent is miscible with the reservoir crude, it removes essentially all of the crude oil which it contacts.

A principal difficulty with the miscible displacement process has been the proper selection of an oil solvent. Most materials are not miscible with both the oil to be recovered and the water which drives the solvent bank. The relatively few materials which exhibit such mutual miscibility often lose this quality in the reservoir. The solvent can become saturated with water and become immiscible with oil. The solvent can precipitate components of the crude oil causing an immiscible displacement.

To combat these problems it has been suggested that a polar organic solvent having high oil solubility and low water solubility be used as a first bank. The first bank is then displaced by a second bank containing a surface active agent and water. The surfactant is necessary because in its absence the polar organic solvent is essentially insoluble in water, and the second bank could not effectively displace the first. It has been further suggested that such a process can be further improved by including a tall oil additive in the first bank. The tall oil additive reduces the cost of the first bank by replacing a portion of the more expensive polar organic solvent with less expensive tall oil additive. The tall oil additive also increases the viscosity of the first bank and thereby improves its ability to recover oil. While such processes are effective methods of recovering oil, a continuing need to reduce the cost of such processes exists.

SUMMARY OF THE INVENTION

This invention relates to a method of miscibly displacing a reservoir crude oil utilizing an oil solvent mixture containing a polar organic solvent and a tall oil additive. This bank is displaced by a low-salinity, aqueous solution which is essentially surfactant free. The low-salinity aqueous solution may be injected as a bank and displaced by following high-salinity water or, alternatively, the low-salinity aqueous solution may be continuously injected.

The polar organic material utilized in the practice of this invention is not highly oil soluble in the absence of the tall oil additive. The tall oil additive increases the solubility of the polar organic material to the point where it becomes substantially miscible with the reservoir oil which it replaces. The relatively fresh water which displaces the oil solvent mixture precipitates the tall oil additive and leaves relatively pure polar organic solvent at the trailing edge of the bank. The polar organic material is selected so that it is substantially miscible with relatively fresh water and the bank is therefore miscibly displaced by water at its trailing edge.

The oil recovery efficiency of this method is slightly reduced from earlier methods. The economics of the process are, however, radically improved.

It is an object of this invention to improve the recovery of oil from subterranean formations. It is a further object of this invention to reduce the cost of a miscible displacement technique for the recovery of oil.

Objects and features of the invention not apparent in the above discussion will become evident on consideration of the following description of the invention.

DESCRIPTION OF THE PREFERRED EMBODIMENT

This invention relates to a method of recovering oil using an oil solvent mixture. The oil solvent mixture has the unique quality of changing solubility characteristics between its forward and trailing edges. At the forward edge of the mixture, it is soluble with reservoir oil and is substantially insoluble with the connate water. At the trailing edge of mixture, it attains very high solubility with displacing low-salinity water. The changing solubility characteristics of the oil solvent mixture is a result of a change in its composition between its leading and trailing edges.

The essential components of the oil solvent mixture are a polar organic compound, such as tertiary butyl alcohol, and a tall oil additive, such as tall oil pitch. Such a mixture is highly soluble with crude oils and has very low solubility with saline waters. Fresh or low-salinity water is much more soluble in the oil solvent mixture. When the oil solvent mixture is contacted with low-salinity water, significant quantities of water will be solubilized in the mixture. As the water content of the mixture increases, the tall oil additive will precipitate. After this precipitation has occurred, the mixture will contain a high proportion of polar organic solvents, minor quantities of tall oil additive, and water. Such a mixture of changed composition will have extremely high and favorable solubility with the low-salinity water and, in fact, will be substantially miscible with water. Thus the leading edge of the oil solvent mixture has a very high solubility with oil and a very low solubility with connate water; the trailing edge has a very high solubility with low-salinity water.

When the term "miscible" is applied to the solubility relationship of fluids, it is sometimes given a very restrictive meaning. Two liquids are miscible in that sense when they can be mixed in all proportions without phase separation. The term "substantially miscible" as used with reference to the fluids of this process is intended to be less restrictive than the definition given above. For the purposes of this application, the term "substantially miscible" shall mean that two liquids are at least very highly soluble. Such a definition will of course, also encompass the more restrictive meaning of miscible. It should also be noted that the term "miscible displacement" is not limited to a process where the displaced and displacing liquids are miscible in the strict sense. As used herein the term "miscible displacement" shall mean that a fluid is displaced in a manner which more nearly approximates a displacement between miscible fluids than a displacement between immiscible fluids.

In a typical reservoir in which the invention of this application would be practiced, two immiscible fluid phases exist — residual oil and high salinity reservoir brine. When the oil solvent mixture is injected into and displaced through the reservoir by the low-salinity brine, it miscibly displaces the reservoir crude oil and immiscibly displaces the reservoir brine. The displacing low-salinity water miscibly displaces the oil solvent mixture and the high-salinity connate water. The terms "connate water" and "reservoir brine" as used herein refer to the water in the formation prior to the initiation of this process. These waters may be naturally occurring formation water or may be water which was previously injected into the formation in a waterflood or similar operation.

As the oil solvent mixture moves through the formation between injection and production wells, four zones can be visualized. In the first zone the reservoir fluids, oil and connate water, are at their original saturation levels existing prior to the practice of the process. In the second zone the effects of the process begin to be felt—a bank of oil begins to build up in the region forward of the oil solvent mixture. With an increase in oil saturation in this region there is a concurrent decrease in the saturation of the connate water. In the third zone, the oil solvent mixture and the reduced saturation connate water flow. The oil solvent mixture displaces essentially all of the reservoir oil before it and, therefore, essentially no oil is left in this region. The immiscible displacement of the connate water is less efficient and some connate water saturation remains. Following the oil solvent mixture is a fourth zone of low-salinity brine. This low-salinity brine miscibly displaces both the oil solvent mixture and the remaining high-salinity reservoir brine.

As was previously stated, the essential components of the oil solvent mixture are a tall oil additive and a polar organic compound. A more complete description of these materials will follow to give a clear understanding of this invention.

The source of tall oil and its chemical derivatives is the pine tree. In the sulfate or Kraft paper process, chips of pinewood are digested or cooked under pressure in an alkaline solution. This process frees the cellulose from the other wood constituents. The highly alkaline solutions form soluble sodium soaps of the lignins, rosins and fatty acids originally present as esters. These are washed out of the wood pulp as a dark solution known as "black liquor" which is concentrated in evaporators. When the partially concentrated solution is cooled and allowed to settle, fatty acid and rosin soaps separate as a brown curdy mass called "black liquor" soap. This soap is skimmed off for further processing. The "black liquor" soap is initially acidulated to release free rosin acids and fatty acids from their salts, lignin and water soluble wood constituents. Separation of these products by decantation or centrifugation yields the free rosin and fatty acids or crude tall oil which is further processed by fractional distillation. The crude tall oil is charged into vacuum or steam fractionating towers. Generally, the crude tall oil enters the first of two fractionating towers where the high-boiling constituents containing color bodies are removed from the bottom as tall oil pitch. The vapors then pass overhead into a second tower and are fractionated into tall oil rosins which are withdrawn from the bottom of the column and into tall oil fatty acids of varying rosin acid contents. At the top of the tower, lower boiling fatty acids and unsaponifiables are taken off as tall oil heads. Additional towers are commonly used to produce tall oil fatty acids of greater purity. These constituents including crude tall oil, tall oil pitch, tall oil rosin, tall oil fatty acids, and tall oil heads are collectively known as tall oil additives herein.

Tall oil pitch is preferred for use in the practice of this invention. Tall oil pitch is a semifluid, tarlike material composed of rosin acids and their esters, fatty acids and their esters, and unsaponifiables which are essentially a mixture of hydrocarbons, alcohols, and sterols. The pitch is employed in its natural, unneutralized state and in this state it is soluble in oils and oillike liquids and essentially insoluble in water. Tall oil pitch is the least expensive of the tall oil additives and has the greatest effect of the various tall oil additives in increasing the viscosity of the oil solvent mixture.

The polar organic solvents which are employed in the practice of this invention are organic liquids which are capable of being miscibly displaced by low-salinity aqueous solutions and which are capable of miscibly displacing reservoir oil when combined with the tall oil additives. The solvents should have very high water solubility and should be substantially miscible with water of low salinity. The characteristics of the polar organic solvents which will govern their water solubility and their ability to miscibly displace reservoir oil include the type and degree of polar substitution, the degree of branching of the hydrocarbon, the molecular weight of the solvent and the type of carbon-carbon bonding in the hydrocarbon. The ability of a particular polar organic solvent to perform these desired functions can readily be determined by one skilled in the art of physical chemistry using routine laboratory testing.

Typical polar organic solvents which might be used in the practice of this invention in combination with the tall oil additive include the normal and secondary alcohols having one to three carbon atoms per molecule tertiary butyl alcohol; the normal secondary, tertiary and cyclo-amines having one to five carbon atoms per molecule; organic acids having one to four carbon atoms per molecule; acetone; aldehydes having one to three carbon atoms per molecule, and mixtures of two or more of such solvents. The carbon-carbon bond of these solvents may be aliphatic including saturates and unsaturates, and cycloaliphatics. It should be understood that the materials listed are representative of suitable polar organic solvents but this invention is not limited to the particular materials itemized. Any polar organic solvent which has satisfactory solubility relationships with water and reservoir oil may be employed.

The preferred polar organic solvents for the use in the practice of this invention are the low molecular weight alcohols. Tertiary butyl alcohol is particularly preferred because of its low cost and favorable solubility characteristics in tall oil pitch—crude oik—connate water—fresh water systems.

The polar organic solvent may be employed as a pure compound, a mixture of compounds, or as a crude mixture containing other oxygenated hydrocarbon products or even containing inert materials having no detrimental effect on the ability of the solvent bank to displace the reservoir oil. For example, a suitable commercial source of oxygenated hydrocarbon comprising a crude mixture of alcohols, ketones, acids, and aldehydes may be obtained by the direct catalytic reaction of air or other oxygen-comprising gas with light paraffinic or olefinic hydrocarbons, such as a light petroleum distillate, in accordance with known procedures.

As previously stated, the oil solvent mixture includes as essential ingredients, a tall oil additive and a polar organic solvent. The relative proportions of these two components depends on a number of factors. The tall oil additive is generally less expensive than the polar organic solvents. Economics will, therefore, generally dictate the use of a relatively large proportion of tall oil additive. The tall oil additive generally has the effect of increasing the viscosity of the oil solvent mixture. Depending upon the desired viscosity for the oil solvent mixture for an efficient displacement technique, the quantity of tall oil additive may be varied. Above all, however, the quantity of tall oil additive in the oil solvent mixture will govern the ability of the mixture to perform its basic function—to miscibly displace the reservoir oil and to be miscibly displaced by the low-salinity driving water. The ability of the oil solvent mixture to perform these basic functions can be readily determined by simple laboratory testing techniques.

These laboratory techniques test the solubility relationships of the mixture at its leading and trailing edges. To test the oil solvent mixture for solubility characteristics at its leading edge where it contacts crude oil and high salinity connate water, a sample of the mixture is first prepared. Under most conditions a concentration of tall oil additive of from 10 to 30 weight percent will be satisfactory. Therefore, initially, tall oil additive concentration of about 20 weight percent is used to prepare the mixture. Equal parts of the oil solvent mixture, reservoir crude oil, and reservoir brine are placed in a vial. The vial is shaken to insure complete mixing of the components and then centrifuged. A satisfactory oil solvent mixture will produce two liquid phases—a dark phase containing crude oil, polar organic solvent and tall oil additive; a light phase which occupies approximately one-third of the total liquid volume consisting essentially of reservoir brine. If three or more phases of substantial volume form, the oil solvent mixture has too high a water solubility. Water has been extracted from reservoir brine causing the precipitation of components of the crude oil and/or the tall oil additive. If this result occurs the concentration of tall oil additive should be increased or a polar organic solvent having a lower water solubility should be used in the oil solvent mixture.

The oil solvent mixture is tested for its solubility characteristics at the trailing edge of the slug in a similar manner. Initially approximately 20 weight percent tall oil additive is mixed with the polar organic solvent. One part of this mixture and two parts of low-salinity brine are added to a vial and the solutions are shaken to insure complete contact between the components. The solution is then centrifuged. The oil solvent mixture is satisfactory if, after this mixing and centrifuging, there is a liquid volume which is equal to or greater than the total volume of polar organic solvent and water and a lesser volume of tall oil additive. The liquid volume may be a solution, a liquid dispersion of tall oil additive, or an emulsion. A substantial portion of the tall oil additive will be precipitation from the oil solvent mixture by the water. This precipitate may be dispersed or emulsified within the liquid volume. The precipitate may adhere to the sides of the vial as a tarlike residue. The quantity of tall oil additive in the oil solvent mixture is too great if a quantity of precipitate is formed which is as great or greater than the tall oil additive in the total solution. Such a large volume precipitate would indicate that the tall oil additive as well as some appreciable portion of the polar organic solvent has been precipitated.

Saline connate water is substantially insoluble in the oil solvent mixture, due to the presence of the tall oil additive and reservoir oil which is entrained in the leading edge of the mixture. Water having a lower salinity than the connate water will be more soluble in the mixture. When the low-salinity water goes into solution with the oil solvent mixture, it causes the tall oil additive to precipitate. The remaining component of the mixture, i.e. low molecular weight polar organic solvent, will have a highly favorable solubility relationship with the low-salinity water. The low-salinity water will, therefore, miscibly displace the trailing edge of the oil solvent mixture.

The salinity of naturally occurring connate brines is variable. The total dissolved solids in these connate waters may range from as low as 2.5 weight percent to as high as 19 weight percent. On an average, the salinity of these waters will be on the order of approximately 6 weight percent. The salinity of the displacing water should be as low as ordinary operating conditions will permit, and certainly no greater than one-half of the salinity of the water which occurs in the formation. Generally, low-salinity surface water will be most satisfactory for use in the displacing water flood.

In the practice of this invention, the volume of the oil solvent mixture should be from about 3 percent to about 20 percent of the reservoir pore volume. The volume of this bank should be sufficiently large that a substantial portion of the reservoir can be traversed before the bank is dissipated by dispersion, diffusion, and dilution by the displacing low-salinity water.

The volume of the displacing low-salinity water should be at least 3 percent of the reservoir pore volume. The fresh water may be used continuously as a displacing agent; it can be injected until economic quantities of oil and oil solvent mixture can no longer be recovered from the reservoir. It will generally be preferable, however, to displace the low-salinity water as a bank followed by the injection of high-salinity, salinity, produced brine. This is because the high-salinity produced brines are generally more readily available in a producing oil field than relatively fresh water.

It is also contemplated that viscosity-increasing agents may be employed in the various banks and following flood water used in the practice of this invention. Such viscosity-increasing agents are well known to those skilled in the art and a suitable viscosity increaser for a given fluid can be readily selected. It is only important that the viscosity-increasing agent be soluble in the fluid at the concentration level necessary to give the desired viscosity, be compatible with its carrier fluid, i.e., does not complex with other components of the fluid or precipitate, be compatible with materials in adjacent banks, and not be strongly absorbed in the formation surface. Representative viscosity-increasing agents are partially hydrolyzed polyacrylamides and heteropolysaccharides of the type disclosed in U.S. Pat. No. 3,305,016, Lindbloom et al. Where the viscosity-increasing agent is added to a bank which contains an alcohol or to a bank which may contact appreciable quantities of alcohol contained in a preceding bank, a viscosity increasing agent such as hydroxypropylmethylcellulose may be used. One such compound is manufactured by the Dow Chemical Company and sold under the trade name Methocel 90 HG. It should be understood, however, that the use of such viscosity-increasing agents are mentioned by way of example and do not form any part of my invention.

The relative economics of the process of this invention is demonstrated by the following example. In this example the process of this invention was compared to a known process in which a bank of polar organic solvent was displaced by a bank of aqueous surfactant solution. These comparative floods were carried out in two Berea cores having permeabilities of approximately 700 md. The core lengths for floods one and two were 4 and 8 feet respectively. The cores were first saturated with a standard brine solution containing:

| Ion | Concentration—p.p.m. |
|---|---|
| $Na^+$ | 36,000 |
| $Ca^{2+}$ | 2,960 |
| $Mg^{2+}$ | 1,032 |
| $Ba^{2+}$ | 112 |
| $Cl^1$ | 64,000 |
| $HCO_3^1$ | 104 |

The cores were then flooded with an Illinois basin crude oil having a 42° API gravity and a viscosity of approximately 4 centipoises until residual water saturation was reached. The standard brine was then injected into both cores until no more oil could be produced and residual oil saturation was reached. The first flood was a known process in which a bank of polar organic solvent and tall oil additive saturated with water was displaced by a second bank of sulfonated surfactant, low molecular weight alcohol and a viscosity-increasing agent. The two banks were displaced through the core by the standard brine solution containing a polymeric viscosity-increasing agent to raise its viscosity to approximately ten centipoises.

The second flood is illustrative of the process of this invention. The first bank of this flood was an oil solvent mixture. Since water is relatively insoluble in this mixture, a smaller bank size was used so that the same quantity of active material would be present in the first bank of both the first and second floods. The first bank material in the second flood was displaced by a bank of 1/12th strength standard brine solution containing a polymeric thickener. The second bank was displaced by standard brine solution containing a heteropolysaccharide viscosity-increasing agent to raise the viscosity to approximately 10 centipoises. The floods in both instance were carried out at a rate which was approximately constant. Other details and the results of these flooding tests are shown in the following table.

TABLE I

FLOOD NO. 1
First Bank

| | |
|---|---|
| Composition—Weight Percent | 70.6% tertiary amyl alcohol |
| | 17.6% tall oil pitch |
| | 11.8% standard brine |
| Volume | 17.5% pore volume |
| Viscosity | 12 centipoises at 22° C. |

Second Bank

| | |
|---|---|
| Composition—Weight Percent | 15% methyl alcohol |
| | 15% sodium xylene sulfonate |
| | 0.2% hydroxypropylmethycellulose |
| | 70% standard brine |
| Volume | 17% pore volume |
| Viscosity | 11 centipoises at 22° C. |
| Residual Oil Recovery at 1 Pore Volume Total Injected Fluid | 88%* |
| Approximate Cost per Barrel of First and Second Banks | $5.40 |

| FLOOD NO. 2 | | |
|---|---|---|
| First Bank | | |
| Composition—Weight Percent | | 85% tertiary butyl alcohol 15% tall oil pitch |
| Volume | | 15.8% pore volume |
| Viscosity | | 10 centipoises at 22° C. |
| Second Bank | | |
| Composition—Weight Percent | | 0.25% hydroxypropylmethylcellulose 99.75% —1/12 strength standard brine |
| Volume | | 17% pore volume |
| Viscosity | | 11 centipoises at 22° C. |
| Residual Oil Recovery at 1 Pore Volume Total Injected Fluids | | 63%* |
| Approximate Cost per Barrel of First and Second Banks | | $2.85 per Barrel |

*Apparent oil recovery. Includes some alcohol.

It should be noted that although there is a decrease in the recovery efficiency of flood number two compared to flood number one, there is a radical decrease in the cost of the process. The approximate cost of the first two banks in flood number one is nearly double that of flood number two.

The invention is further illustrated by the following example:

EXAMPLE I

A petroleum reservoir is waterflooded in a conventional manner to residual oil saturation of about 30 percent of the reservoir pore volume. The connate water contains dissolved solids in the following concentrations:

| Ion | Concentration—p.p.m. |
|---|---|
| $Na^+$ | 36,000 |
| $Ca^{2+}$ | 2,960 |
| $Mg^{2+}$ | 1,032 |
| $Ba^{2+}$ | 112 |
| $Cl^-$ | 64,000 |
| $HCO_3^-$ | 104 |

In accordance with the present invention, a solution containing 75 weight percent tertiary butyl alcohol and 25 percent tall oil pitch is then injected at a selected number of input wells in an amount corresponding to 5 percent of the total reservoir pore volume. Thereafter, essentially fresh water is injected into the formation. This water contains dissolved solids in the following concentrations:

| Ion | Concentration—p.p.m. |
|---|---|
| $Na^+$ | 3,000 |
| $Ca^{2+}$ | 250 |
| $Mg^{2+}$ | 86 |
| $Ba^{2+}$ | 9 |
| $Cl^-$ | 5,330 |
| $HCO_3^-$ | 9 |

The fresh water is thickened by the addition of 0.05 weight percent of a heteropolysaccharides to a viscosity of approximately 5 centipoises at average reservoir shear rates. About 30 percent of this second solution is injected. The thickened water bank is then followed by water or brine until about two pore volumes of cumulative flooding medium has been injected. The two pore volumes injected include the first and second bank solutions and the following water or brine. Displaced reservoir oil is recovered by means of suitable production wells.

The principle of the invention, a detailed description of one specific application of the principle, and the best mode in which it is contemplated to apply that principle have been described. It is to be understood that the foregoing is illustrative only and that other means and techniques can be employed without departing from the true scope of the invention defined in the following claims.

What is claimed is:

1. A method of recovering oil from a subterranean formation containing oil and saline connate water which comprises injecting into the formation an oil solvent mixture containing a polar organic solvent, unneutralized tall oil additive and being substantially free of neutralized tall oil additives, then injecting, immediately following the oil solvent mixture, an aqueous solution which is substantially free of surface active agents and which has a salinity lower than that of the connate water, and recovering oil from the formation which is displaced by the oil solvent mixture and the aqueous solution.

2. A method as defined by claim 1 wherein the tall oil additive is tall oil pitch.

3. A method as defined by claim 1 wherein the polar organic solvent is tertiary butyl alcohol.

4. A method as defined by claim 1 wherein the volume of the oil solvent mixture injected into the formation is between 3 and 20 percent of the pore volume of the formation.

5. A method as defined by claim 1 wherein the volume of the aqueous solution is at least 3 percent of the pore volume of the formation.

6. A method as defined in claim 1 further including displacing the aqueous solution with a second aqueous solution having a salinity which is higher than that of the first aqueous solution.

7. A method as defined by claim 1 wherein the tall oil additive 2 is from 10 to 30 weight percent of the oil solvent mixture.

8. A method of recovering oil from a subterranean formation which comprises injecting into the formation a first solution of a polar organic solvent, unneutralized tall oil additive, and being substantially free of neutralized tall oil additives, then injecting, immediately following the first solution, a second solution of low-salinity water which is substantially free of surface active agents, and recovering oil displaced from the formation by the first and second solutions.